Feb. 7, 1961  A. WÜNSCHE ET AL  2,970,584
VALVE CONTROL FOR INTERNAL COMBUSTION ENGINES
Filed Oct. 23, 1959  2 Sheets-Sheet 1
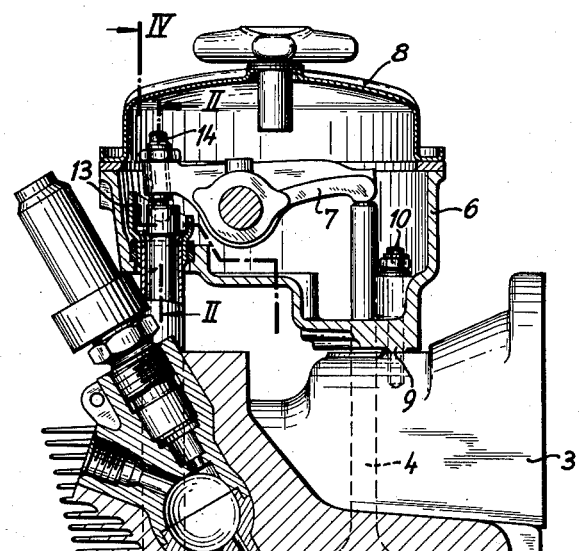
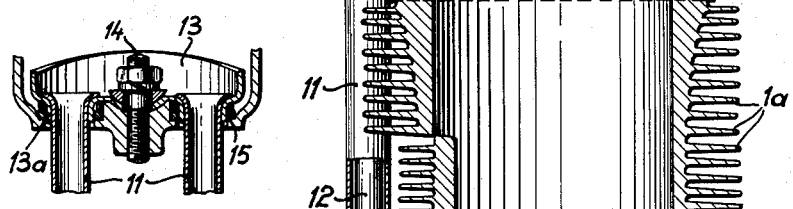
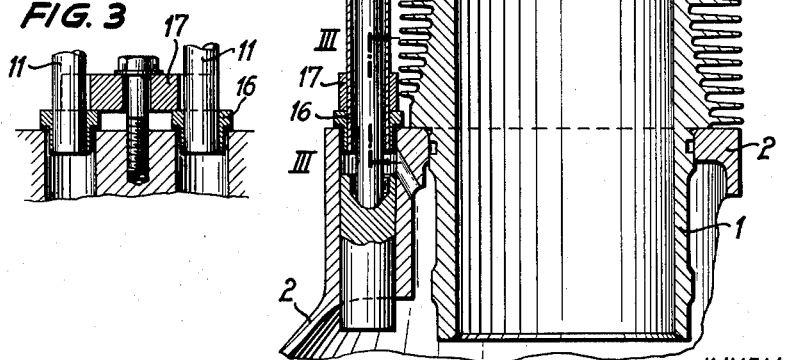
INVENTOR
Adolf Wünsche
Josef Lerch
By
Patent Agent

United States Patent Office 2,970,584
Patented Feb. 7, 1961

2,970,584

VALVE CONTROL FOR INTERNAL COMBUSTION ENGINES

Adolf Wünsche, Ulm (Danube), and Josef Lerch, Leibi, Germany, assignors to Klöckner-Humboldt-Deutz Aktiengesellschaft, Koln, Germany Filed Oct. 23, 1959, Ser. No. 848,462

Claims priority, application Germany Oct. 24, 1958

4 Claims. (Cl. 123—90)

The present invention relates to valve controls for internal combustion engines according to which the valve movement is brought about by push rods and rocker arms.

The present invention while not limited to is of particular importance in connection with engines with direct air cooling. The problem involved in connection with the present invention consists in maintaining a play as uniform as possible in the valve actuating mechanism in spite of varying heat expansion of cylinder and push rods. In an effort to solve this problem, supporting means for the rocker arms have been provided which, if it should be desired, are at the same time designed as a housing and which on one hand rest in or near the valve plane on the cylinder head, and which are furthermore connected to the crank-case by separate supports so that the rocker arm carrier or supporting means will carry out a slight tilting movement during the heating-up and cooling-off of the engine. When separate rocker arm carriers are employed for the inlet and outlet valves respectively, protective tubular members for the push rods of the valve actuating mechanism have been employed as supports which for this purpose had their lower ends connected to the crank-case and their upper ends connected to the supports for the rocker arms. In view of slight differences in length and varying heat expansion of the valves, the employment of separate rocker arm carriers was necessary which, however, brought about a considerable increase in the number of the elements involved thereby increasing the costs.

It is, therefore, an object of the present invention to provide an improved valve control for internal combustion engines, which will overcome the above mentioned drawbacks.

It is another object of this invention to provide a valve control of the type set forth in the preceding paragraph, which will avoid additional supports between the supporting means for the rocker arm and the crank case and which will not interfere with the direct air cooling of the engine.

These and other objects and advantages of the invention will appear more clearly from the following specification in connection with the accompanying drawing, in which:

Fig. 1 illustrates the upper portion of a diesel engine equipped with a valve control according to the present invention.

Fig. 2 is a section along the line II—II of Fig. 1.

Fig. 3 is a section along the line III—III of Fig. 1.

Figure 4:
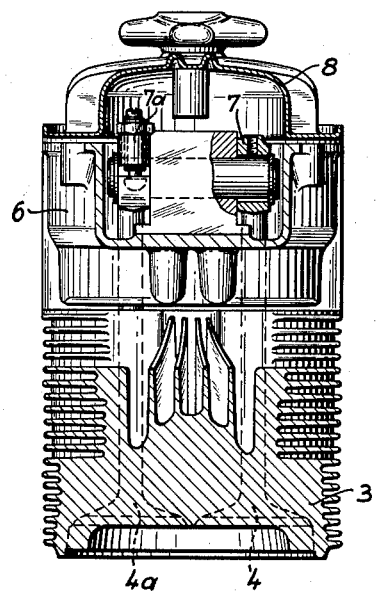
Fig. 4 is a section along the line IV—IV of Fig. 1.

The arrangement according to the present invention is characterized primarily in that the supporting tubular members have their upper ends interconnected by a bridge member which latter at a point between said tubular members is supported by a rocker arm carrier common to the inlet and outlet valve. The said common rocker arm carrier which in this way at the side of the push rod is supported only once, may be journalled in the valve plane so as to be pivotable about an axis or may be supported in the manner of a three-point bearing at spaced points on the cylinder. Minor differences in length of the tubular members and differences in the heat expansion of the valves may occur when employing a single rocker arm carrier for both valves so that the valve drive may be designed in the heretofore customary manner. Additional supports between the rocker arm carrier and the crank-case will in conformity with the present invention be avoided which additional supports would be disadvantageous, especially with machines with direct cooling in view of the fact that the air flow would be interfered with.

Referring now to the drawing in detail, the internal combustion engine shown therein comprises a diesel engine having a cylinder 1 provided with cooling fins 1a and mounted on a crank-case 2. The cylinder 1 has mounted thereon a cylinder head 3 having associated therewith inlet and outlet valves 4 and 4a respectively. Arranged above the cylinder head 3 there is a bridge 6 common to the two valves 4, 4a for journalling the rocker arms 7 and 7a. This bridge may at the same time form an oil-tight housing and may be closed at the top by a lid 8.

Arranged in the axial plane of valves 4, 4a the rocker arm bridge 6 by means of a narrow portion 9 rests upon a plane surface on the upper side of the cylinder head 3 against which it is clamped by means of bolts 10. On the oppositely located side the rocker arm bridge 6 rests upon the crank-case 2 through the intervention of the two protective tubular members 11 of the valve push rods 12. To this end, the upper ends of the tubular members 11 are interconnected by a bridge member 13. This bridge member 13 which may represent a stamped sheet metal part, is provided with sleeve-like extensions 13a engaged by collar-like broadened portions at the ends of the tubular members 11 and fixedly connected thereto for instance by hard soldering or welding. Half way between said tubular members 11, the bridge member 13 is pivotally connected to rocker arm carrier 6 by means of a bolt 14. Interposed between said sleeve-like extensions of bridge member 13 and the rocker arm carrier 6 there are rings 15 made of an elastic material and provided for sealing purposes. These rings 15, however, will permit the occurring minor tilting movements between bridge member 13 and the rocker arm carrier. The lower ends of said tubular members 11 are fixedly connected to a short collar-like sleeve 16, for instance by soldering or welding. The said collar-like sleeve 16 is engaged by a bridge carrier 17 and, more specifically, by forked portions at each end thereof for connecting the bridge carrier 17 to the crank case 2.

It is, of course, to be understood that the present invention is, by no means, limited to the particular constructions shown in the drawing but also comprises any modifications within the scope of the appended claims.

What we claim is:

1. In an internal combustion engine: a crank-case, a cylinder connected to said crank-case, a cylinder head supported by said cylinder, an inlet valve associated with said cylinder head, an outlet valve associated with said cylinder head, a plurality of rocker arms for respectively actuating said inlet and outlet valves, supporting means common to and supporting said rocker arms and resting at one side on said cylinder head, a plurality of push rods respectively arranged for actuating said rocker arms, tubular members respectively surrounding said push rods and extending from the other side of said supporting means to said crank-case, and bridge means interconnecting the upper ends of said tubular members, said bridge means being supported by and pivotally connected to said supporting means.

2. In an internal combustion engine: a crank-case, a cylinder connected to said crank-case, a cylinder head supported by said cylinder, an inlet valve associated with said cylinder head, an outlet valve associated with said cylinder head, a plurality of rocker arms for respectively actuating said inlet and outlet valves, supporting means common to and supporting said rocker arms and resting at one side on said cylinder head, a plurality of push rods respectively arranged for actuating said rocker arms, tubular members respectively surrounding said push rods and extending from the other side of said supporting means to said crank-case, and bridge means made of sheet metal and provided with sleeve-like extensions surrounding the ends of said tubular members and fixedly connected thereto, said bridge means being supported by and pivotally connected to said supporting means.

3. In an internal combustion engine: a crank-case, a cylinder connected to said crank-case, a cylinder head supported by said cylinder, an inlet valve associated with said cylinder head, an outlet valve associated with said cylinder head, a plurality of rocker arms for respectively actuating said inlet and outlet valves, supporting means common to and supporting said rocker arms, and resting at one side on said cylinder head, a plurality of push rods respectively arranged for actuating said rocker arms, tubular members respectively surrounding said push rods and extending from the other side of said supporting means to said crank-case, and bridge means supported by and pivotally connected to said supporting means, said tubular members having one end thereof provided with a collar-like widened portion connected to said bridge means.

4. In an internal combustion engine: a crank case, a cylinder rigidly mounted on the crankcase, a cylinder head rigid with said cylinder, an inlet valve in said cylinder head, an outlet valve in said cylinder head, a rocker arm associated with each valve, a rocker arm support tiltably supporting both of said rocker arms, said rocker arm support at one side having a reduced area of engagement with said cylinder head between said valves, a push rod for each rocker arm extending from the crankcase upwardly into engagement with said rocker arms with the ends thereof opposite said valves, a tubular member surrounding each push rod and each tubular member having its one end fixed to the crankcase and its other end extending through said rocker arm support, and bridge means interconnecting the other ends of said tubular members, said bridge means being pivotally supportingly engaged by said rocker arm support between said tubular members and attached to said rocker arm support.

References Cited in the file of this patent
UNITED STATES PATENTS

| | | |
|---|---|---|
| 1,993,875 | Daub | Mar. 12, 1935 |
| 2,758,580 | Blazer | Aug. 14, 1956 |